United States Patent
Liu

(10) Patent No.: US 11,078,081 B2
(45) Date of Patent: Aug. 3, 2021

(54) GRAPHENE FILM PREPARED WITH FLEXIBLE POLYIMIDE AND PREPARATION METHOD THEREOF

(71) Applicant: SHENZHEN DANBOND TECHNOLOGY CO., LTD, Guangdong (CN)

(72) Inventor: Ping Liu, Guangdong (CN)

(73) Assignee: SHENZHEN DANBOND TECHNOLOGY CO., LTD, Guangdong (CN)

(*) Notice: Subject to any disclaimer, the term of this patent is extended or adjusted under 35 U.S.C. 154(b) by 382 days.

(21) Appl. No.: 16/121,227

(22) Filed: Sep. 4, 2018

(65) Prior Publication Data
US 2020/0024142 A1 Jan. 23, 2020

Related U.S. Application Data

(63) Continuation of application No. PCT/CN2016/095531, filed on Aug. 16, 2016.

(30) Foreign Application Priority Data

Mar. 4, 2016 (CN) .................. 201610125008.X

(51) Int. Cl.
*C01B 32/184* (2017.01)
*B32B 37/06* (2006.01)
*B32B 37/10* (2006.01)
*B32B 38/00* (2006.01)

(52) U.S. Cl.
CPC ............ *C01B 32/184* (2017.08); *B32B 37/06* (2013.01); *B32B 37/10* (2013.01); *B32B 38/004* (2013.01); *B32B 2379/08* (2013.01); *C01B 2204/24* (2013.01); *C01B 2204/26* (2013.01)

(58) Field of Classification Search
CPC ............ C01B 32/184; C01B 2204/24; C01B 2204/26; B32B 37/06; B32B 37/10; B32B 38/004; B32B 2379/08; B32B 2313/04; B32B 2309/02
See application file for complete search history.

(56) References Cited

U.S. PATENT DOCUMENTS

2016/0279902 A1* 9/2016 Yasuda .................. B32B 27/06

FOREIGN PATENT DOCUMENTS

| CN | 103298402 A | 9/2013 | |
|---|---|---|---|
| CN | 103922324 A | 7/2014 | |
| CN | 104495795 A | 4/2015 | |
| CN | 104909357 A | 9/2015 | |
| CN | 104909358 A | 9/2015 | |
| CN | 105600782 A | 5/2016 | |
| JP | H0517117 A | 1/1993 | |
| WO | WO-2015064519 A1 * | 5/2015 | ............. B32B 27/06 |

OTHER PUBLICATIONS

English machine translation of CN104495795A (2015).*
English machine translation of CN104909358A (2015).*
International Search Report (English and Chinese) and Written Opinion issued in PCT/CN2016/095531, dated Dec. 12, 2016, 13 pages.
Uwai et al.,"Preparation of High-density Glassy Carbon from Poylimide", Carbon Techniques, No. 2, Dec. 31, 1991, 2 pages (Cited in PCT International Search Report).

* cited by examiner

*Primary Examiner* — Richard M Rump
(74) *Attorney, Agent, or Firm* — Hamre, Schumann, Mueller & Larson, P.C.

(57) ABSTRACT

A preparation method of a graphene film prepared with flexible polyimide includes the following steps: S1, laminating a plurality of polyimide films; S2, performing heat treatment while pressing the laminated polyimide films for bonding, wherein the temperature of heat treatment is lower than the temperature at which a thermoplastic polyimide film begins thermal decomposition, so that the laminated polyimide films are bonded together to form a polyimide composite film; and S3, raising the temperature of the polyimide composite film to be higher than the temperature at which the polyimide film begins thermal decomposition for heat treatment and carbonization treatment, thereby obtaining a carbonized multifunctional film, and performing graphitization treatment as required. The graphene film prepared by the present invention has ultra-high thermal conductivity, excellent flexibility and bending resistance, anisotropy and good electrical boundary shielding effect and magnetic boundary shielding effect, and a good application prospect.

9 Claims, No Drawings

GRAPHENE FILM PREPARED WITH FLEXIBLE POLYIMIDE AND PREPARATION METHOD THEREOF

CROSS REFERENCE TO RELATED APPLICATIONS

This application is a continuation application of PCT/CN2016/095531 filed on 2016 Aug. 16. The contents of the above-mentioned applications are all hereby incorporated by reference.

TECHNICAL FIELD

The invention relates to a graphene film prepared with flexible polyimide and a preparation method thereof.

BACKGROUND

Carbon material occupies an important position in industrial materials after metal, glass and ceramics due to its superior physical, heat resistance, chemical resistance and electrical conductivity. It is widely used as an electrode material, a heat dispersing material, a heat-resistant sticker, a high electrical conductive material and the like. Although it has other excellent properties, it was left out because it was not used. Until the discoveries of preparation methods of crystalline fullerene with 60 carbon atoms in the shape of a football lantern in 1985, tubular crystalline nanotubes with only a single layer of hexagonal mesh-like carbon atoms in 1991, and non-tubular single-layer graphene in the form of a single layer of hexagonal mesh-like crystal plane in 2003, the carbon material has regained the attention of the world. Nowadays, research on electronic materials and semiconductor materials is quite popular. The layered crystals of these hexagonal mesh-like carbon atoms are natural graphite. In the past, the layered crystalline graphite can only grow by depositing hydrocarbon gas. This method requires heat treatment for 20 working days or more. Because of its rigidity, poor workability and inability to bend, it is only used as a thermal insulation tile on a space shuttle, etc., which has a very limited use.

In the 1990s, focusing on people's livelihood instruments, with the acceleration of the trend from analog to digitalization, the demand for CPUs for electronic products, medical apparatus and instruments, and semiconductor components is becoming further popular, and the heat release of medical apparatus and instruments, semiconductor lighting, and CPU chips has become a big problem. Along with the high clusterization of the CPU chip, the line wiring width is narrowed, and the Joule heat generation is increased, resulting in a high temperature, which leads to a low semiconductor performance, and a shortened battery life. How to make heat out is an important factor affecting mechanical performance. This requires finding a material that has high thermal conductivity and excellent light workability.

SUMMARY OF THE INVENTION

The main objective of the present invention is to provide a graphene film prepared with flexible polyimide and a preparation method thereof, in view of the deficiencies of the prior art.

In order to achieve the above objective, the present invention adopts the following technical solutions:

a preparation method of a graphene film prepared with flexible polyimide, includes the following steps:

S1, laminating a plurality of polyimide films;

S2, performing heat treatment while pressing the laminated polyimide films for bonding, the temperature of heat treatment is lower than the temperature at which a thermoplastic polyimide film begins thermal decomposition, so that the laminated polyimide films are bonded together to form a polyimide composite film; and S3, raising the temperature of the polyimide composite film to be higher than the temperature at which the polyimide film begins thermal decomposition for heat treatment and carbonization treatment, thereby obtaining a carbonized multifunctional film, and performing graphitization treatment as required.

Further, in step S2, the laminated polyimide films are hot-pressed for bonding using a roller hot press.

Further, the temperature at which the polyimide film begins thermal decomposition is about 500° C., and in step S2, the temperature is raised from 10° C. to 500° C. at a processing rate of 1 m/min and under a pressure of 50 kg/cm².

Further, the polyimide film has a thickness of 50 µm and a glass transition temperature of 400° C., and the temperature at which the polyimide film begins thermal decomposition is about 500° C.

Further, in step S3, the temperature is raised from 500° C. to 1000° C.–1500° C. at a processing rate of 1 m/min and the polyimide composite film is subjected to carbonization treatment under a pressure of 75 kg/cm². Preferably, the temperature is raised in a non-oxidizing environment.

Further, in step S3, the polyimide composite film is placed in a heating furnace, filled with black lead powder, sealed, heated and pressurized.

Further, in step S3, the graphitization treatment includes graphitizing the multifunctional film by raising the temperature from 1500° C. to 2000° C. in a graphitization furnace at a processing rate of 0.5 m/min and under a pressure of 100 kg/cm² to obtain a vitrified carbon film.

Further, in step S3, the vitrified carbon film is further heated in the graphitization furnace, from 2000° C. to 2800° C., at a processing rate of 0.4 m/min and under a pressure of 120 kg/cm² for graphitization treatment, to obtain a graphitized multifunctional film.

Further, in step S3, the graphitized multifunctional film is further heated in a graphitization furnace, from 2800° C. to 3200° C., at a processing rate of 0.4 m/min and under a pressure of 150 kg/cm² for graphitization treatment, to obtain a vitric carbon multifunctional graphene film.

A graphene film produced with a flexible polyimide, is the multifunctional graphene film prepared by any of the preceding methods for preparing a graphene film.

The beneficial effects of the present invention:

the present invention provides a graphene film prepared by polyimide and a preparation method thereof, in which an aromatic polyimide film is subjected to sintering carbonization and black lead formation to form a flexible and multifunctional graphene film; and the prepared graphene film has ultra-high thermal conductivity, a heat conduction coefficient of 1500 w/m·K in the ab direction and 5 w/m·k in the C-axis direction, excellent flexibility and bending resistance, 10,000 times or more under R=2 mm 280° C., and has anisotropy and good electrical boundary shielding effect and magnetic boundary shielding effect.

In an embodiment of the present invention, the flexible polyimide film is subjected to a special sintering method, the polyimide film is first heat-treated while being pressed for bonding at a temperature lower than the temperature at which a thermoplastic polyimide film begins thermal decomposition to form a polyimide composite film, and then is further heat-treated and carbonized at a temperature higher than the thermal decomposition starting temperature of thermoplastic polyimide film, thereby obtaining a carbonized multifunctional film, and is graphitized according to the product requirements to obtain a multifunctional graphene film. In the preparation process, an amorphous, plastic and heat-resistant film of an aromatic polyimide film is carbonized and graphitized to form solid carbonization, which can eliminate the complicated process for processing the carbon material in the past, and obtain a multi-layer multifunctional graphene film that has the functions of roll-shaped pliability, super thermal conductivity, heat release line, anisotropy and shielding effect, and a high yield, is simple, can be industrially produced, and can be roll-formed.

The multifunctional graphene film produced by the above-mentioned polymer sintering method of the flexible polyimide film can be widely applied in high-tech fields such as aviation, spaceflight, X-ray optical splitter, neutral sub-line optical splitter, neutral sub-line filter, and radiation optical component, etc.

DETAILED DESCRIPTION

Embodiments of the present invention are described in detail below. It should be emphasized that the following description is only illustrative, and is not intended to limit the scope of the present invention.

In one embodiment, a preparation method of a graphene film prepared with flexible polyimide, includes the following steps:

S1, laminating a plurality of polyimide films;

S2, performing heat treatment while pressing the laminated polyimide films for bonding, the temperature of heat treatment is lower than the temperature at which a thermoplastic polyimide film begins thermal decomposition, so that the laminated polyimide films are bonded together to form a polyimide composite film;

and S3, raising the temperature of the polyimide composite film to be higher than the temperature at which the polyimide film begins thermal decomposition for heat treatment and carbonization treatment, thereby obtaining a carbonized multifunctional film, and performing graphitization treatment as required. Preferably, in step S3, the temperature is raised in a non-oxidizing environment.

In a preferred embodiment, in step S2, the laminated polyimide films are hot-pressed for bonding using a roller hot press.

In a preferred embodiment, the temperature at which the polyimide film begins thermal decomposition is about 500° C., and in step S2, the temperature is raised from 10° C. to 500° C. at a processing rate of 1 m/min and under a pressure of 50 kg/cm$^2$.

In a preferred embodiment, the polyimide film has a thickness of 50 μm and a glass transition temperature of 400° C., and the temperature at which the polyimide film begins thermal decomposition is about 500° C.

In a preferred embodiment, in step S3, the temperature is raised from 500° C. to 1000° C.-1500° C. at a processing rate of 1 m/min and the polyimide composite film is subjected to carbonization treatment under a pressure of 75 kg/cm$^2$.

In a more preferred embodiment, in step S3, the polyimide composite film is placed in a heating furnace, filled with black lead powder, sealed, heated and pressurized.

In a preferred embodiment, in step S3, the graphitization treatment includes graphitizing the multifunctional film by raising the temperature from 1500° C. to 2000° C. in a graphitization furnace at a processing rate of 0.5 m/min and under a pressure of 100 kg/cm$^2$ to obtain a vitrified carbon film.

In a more preferred embodiment, in step S3, the vitrified carbon film is further heated in the graphitization furnace, from 2000° C. to 2800° C., at a processing rate of 0.4 m/min and under a pressure of 120 kg/cm$^2$ for graphitization treatment, to obtain a graphitized multifunctional film.

In a further preferred embodiment, in step S3, the graphitized multifunctional membrane is further heated in the graphitization furnace, from 2800° C. to 3200° C. at a processing rate of 0.4 m/min and under a pressure of 150 kg/cm$^2$ for graphitization treatment, to obtain a vitric carbon multifunctional graphene film.

In another embodiment, a graphene film prepared from a flexible polyimide is the multifunctional graphene film prepared by the method for preparing a graphene film of any of the preceding embodiments.

According to an embodiment of the present invention, a multifunctional body is obtained by processing at a temperature lower than the temperature at which a polyimide film begins thermal decomposition, and then the temperature is raised to a temperature higher than the thermal decomposition starting temperature for heat treatment to obtain a carbonized multifunctional film. The composition of the final product carbon material can be freely changed according to different requirements. When the temperature is raised to a thermal decomposition temperature or higher, the imide bonding is cracked, which makes various gases such as carbon monoxide, carbon dioxide, hydrogen, nitrogen, and the like free, and the aromatic ring is condensed and polycyclicized to form a carbon precursor structure, thus a certain degree of residual atomic state is reached according to the free state of these gases, and becomes a carbonized vitric carbon state, and formation of a graphitized crystal structure state is achieved by further contorring, and a multifunctional carbon graphene film is obtained. Depending on the processing conditions, it is possible to choose to manufacture different carbonized products and graphitized products.

According to a preferred embodiment of the present invention, provided is a process capable of producing highly crystalline carbon by adopting a specific polymer polyimide film, and processing at a high temperature (for example, 3000° C.) in an anaerobic state, thereby removing hydrogen, oxygen and nitrogen therefrom, and subjecting the remaining carbon atoms to special passivation treatment and crystallization. By changing the treatment method, the bonding between the crystal layers can be freely controlled from the state of high elastic rate to the state of low flexibility, and a multilayer crystalline graphene having a structure similar to a single crystal is obtained, which can realize the combination of the advantages of thermal conductivity, electrical conductivity, and non-directional softness. In terms of structure, an aggregate structure of a single crystal also has the characteristics of a single crystal.

According to a preferred embodiment of the present invention, the specific polymer polyimide film used is a polyimide film produced by using an aromatic tetracarboxylic dianhydride compound and an aromatic diamine compound, obtained after sublimation of a mixture of acetic anhydride dimethylpyridine propionic anhydride or butyric anhydride, etc., using a dehydrating agent and a catalyst (see Chinese Patent Application No. 201310144099.8). Since the film has excellent orientation, from the comparison total number of axial crystal from normal lines at the graphitization level to the tilt direction, the graphitized layer is oriented in a plane, the radiation is excellent in reflection, and the thermal conductivity in the surface direction is improved. Since the specific polyimide film has a high birefringence property, the thickness expansion in the plane direction is reduced in carbonization and graphitization, and the amount of change in the surface direction length is also reduce, so that the tendency disorder is reduced, the linear orientation is improved, the strength is also improved, cracking is less likely to occur, and heating and pressurization can be arbitrarily performed without damage.

According to a preferred embodiment of the present invention, the polyimide film used can be a thermosetting and thermoplastic polyimide resins obtained by a chemical reaction. It is preferred to have the necessary doping to ensure planarization of the original organic molecules, high directionality, and simple release of non-carbon atoms during carbonization and graphitization process. The PI film is formed by the structure of an original molecule under certain process conditions. The formation of an initial film depends on the original molecular structure, ensuring that the initial film has a thickness which does not affect the carbonization process, has a large thermal diffusivity in the C-axis direction, is anisotropic, and is suitable for the elimination of hot spots. The DPI or BPI of chemical method has extremely stable characteristics.

According to a preferred embodiment of the present invention, provided is a manufacturing method of a multifunctional body by binding the PI films by a special purification treatment, raising the temperature in a non-oxidizing environment to a thermal decomposition temperature or higher for heat treatment, which can suppress the occurrence of structural defects such as breakage, etc. during solid carbonization, improve yield, reduce cost, achieve carbonization or even graphitization, and provide an industrially advantageous carbonized aromatic polyimide film multifunctional body.

Example 1

The polyimide film (trade name: DPI50, thickness: 50 μm, glass transition temperature: 400° C., thermal decomposition starting temperature: about 500° C.) of Danbond Technology Co., Ltd. was cut into a rectangle of 20 cm bilaterally, carbonized and graphitized, pressed for bonding by a hot press, and heated from 10° C. to 500° C. at a processing rate of 1 m/min and under a pressure of 50 kg/cm$^2$, and rolled and wrapped up to obtain a multifunctional body carbon graphene film with no breakage, no peeling between layers or delamination appearance, a heat conduction coefficient of 1500 w/m·K in the ab direction and 5 w/m·k in the C axis, and having excellent flexibility and bending resistance, 10,000 or more times under R=2 mm 280° C., and anisotropy and electromagnetic shielding effects. Then, the multifunctional body coil is placed in a heating furnace, filled with black lead powder, sealed, and heated from 500° C. to 1000° C.-1500° C. at a processing rate of 1 m/min in the heating furnace, and carbonized under a pressure of 75 kg/cm$^2$, and wrapped up to obtain a film layer with good flatness, no peeling, and no warping. After the carbonization was completed, a multifunctional film having a thickness of 30 μm was obtained, and graphitization was performed according to different requirements.

Example 2

The multifunctional film obtained in Example 1 was further heated from 1500° C. to 2000° C. at a processing rate of 0.5 m/min and under a pressure of 100 kg/cm$^2$ for graphitization, to obtain an X-ray amorphous vitrified carbon film with no cracks, no warping, and no bending.

Example 3

The multifunctional film obtained in Example 2 was further heated in a graphitization furnace, from 2000° C. to 2800° C., at a processing rate of 0.4 m/min and under a pressure of 120 kg/cm$^2$ for graphitization treatment, to obtain a multi-layer graphitized multifunctional film. According to the X-ray reflection Brownian method, a fully graphitized multifunctional film product having a reflection line average layer spacing force of 0.3 nm or less and a C-axis direction crystal thickness of 1000 Å or more can be obtained.

Example 4

The multifunctional film obtained in Example 3 was further heated in a graphitization furnace in the same manner, from 2800° C. to 3200° C., at a processing rate of 0.4 m/min and under a pressure of 150 kg/cm$^2$ for graphitization treatment, to obtain a vitric carbon multifunctional film (multifunctional graphene film) product having high quality and good flexibility, which can suppress the occurrence of structural defects such as breakage, etc. during solid carbonization, improve the yield, reduce the cost, achieve the function of the product after the carbonized graphitization, and completely solve the problems of industrial production from the energy consumption and the time consumption.

Comparative Example 1

By changing the temperature conditions in which the treatment was carried out at a temperature lower than the thermal decomposition starting temperature in Example 1, the temperature of the hot press and the heating furnace were changed to 700° C., the multifunctional film may produce interlayer breakage, and cannot form the subsequent vitric carbon film and graphitized structure. Further, the same test was repeated in the thermal decomposition starting temperature range of the polyimide film, and as a result, a good-quality vitric carbon film and a multifunctional graphene carbonized film with a graphitized structure which could not be obtained by pre-rolling at a temperature lower than the thermal decomposition starting temperature were obtained.

The above is a further detailed description of the present invention in combination with specific/preferred embodiments, and it is not intended that the specific embodiments of the present invention are limited to the description. For those of ordinary skill in the art to which the present invention pertains, it is also possible to make a number of alternatives or modifications to these described embodiments without departing from the spirit and scope of the present invention, and such alternatives or modifications are considered to be within the scope of the present invention.

The invention claimed is:
1. A preparation method of a graphene film prepared with flexible polyimide, comprising the following steps:
S1: laminating a plurality of polyimide films;
S2: performing a heat treatment while pressing the laminated polyimide films for bonding, wherein the temperature of the heat treatment is lower than the temperature at which a thermoplastic polyimide film begins thermal decomposition, so that the laminated polyimide films are bonded together to form a polyimide composite film; and S3: raising the temperature of the polyimide composite film to be higher than the temperature at which the polyimide films begin thermal decomposition for heat treatment and carbonization treatment, thereby obtaining a carbonized multifunctional film, and subjecting the carbonized multifunctional film to a graphitization treatment, wherein, in step S3, the polyimide composite film is placed in a heating furnace, filled with black lead powder, sealed, heated, and pressurized.

2. The preparation method of graphene film prepared with flexible polyimide according to claim 1, wherein, in step S2, the laminated polyimide films are hot-pressed for bonding using a roller hot press.

3. The preparation method of graphene film prepared with flexible polyimide according to claim 1, wherein the temperature at which the polyimide films begin thermal decomposition is about 500° C., and in step S2, the temperature is raised from 10° C. to 500° C. at a processing rate of 1 m/min and under a pressure of 50 kg/cm$^2$.

4. The preparation method of graphene film prepared with flexible polyimide according to claim 1, wherein each of the polyimide films has a thickness of 50 μm and a glass transition temperature of 400° C., and the temperature at which the polyimide films begin thermal decomposition is about 500° C.

5. The preparation method of graphene film prepared with flexible polyimide according to claim 1, wherein, in step S3, the temperature of the polyimide composite film is raised from 500° C. to 1000° C.-1500° C. at a processing rate of 1 m/min, and the polyimide composite film is subjected to carbonization treatment under a pressure of 75 kg/cm$^2$.

6. The preparation method of graphene film prepared with flexible polyimide according to claim 1, wherein, in step S3, the graphitization treatment includes graphitizing the carbonized multifunctional film by raising the temperature from 1500° C. to 2000° C. in a graphitization furnace at a processing rate of 0.5 m/min and under a pressure of 100 kg/cm$^2$ to obtain a vitrified carbon film.

7. The preparation method of graphene film prepared with flexible polyimide according to claim 6, wherein the vitrified carbon film is further heated in the graphitization furnace from 2000° C. to 2800° C., and subjected to a further graphitization treatment at a processing rate of 0.4 m/min and under a pressure of 120 kg/cm$^2$, to obtain a graphitized multifunctional film.

8. The preparation method of graphene film prepared with flexible polyimide according to claim 7, wherein the graphitized multifunctional film is further heated in the graphitization furnace from 2800° C. to 3200° C., and subjected to a further graphitization treatment at a processing rate of 0.4 m/min and under a pressure of 150 kg/cm$^2$, to obtain a vitric carbon multifunctional graphene film.

9. The preparation method of graphene film prepared with flexible polyimide according to claim 1, wherein the temperature of the polyimide composite film is raised in a non-oxidizing environment.

* * * * *